Sept. 29, 1925.
W. H. PRIESS
1,555,253
VARIABLE ELECTRICAL CONDENSER
Filed Jan. 6, 1922 4 Sheets-Sheet 1
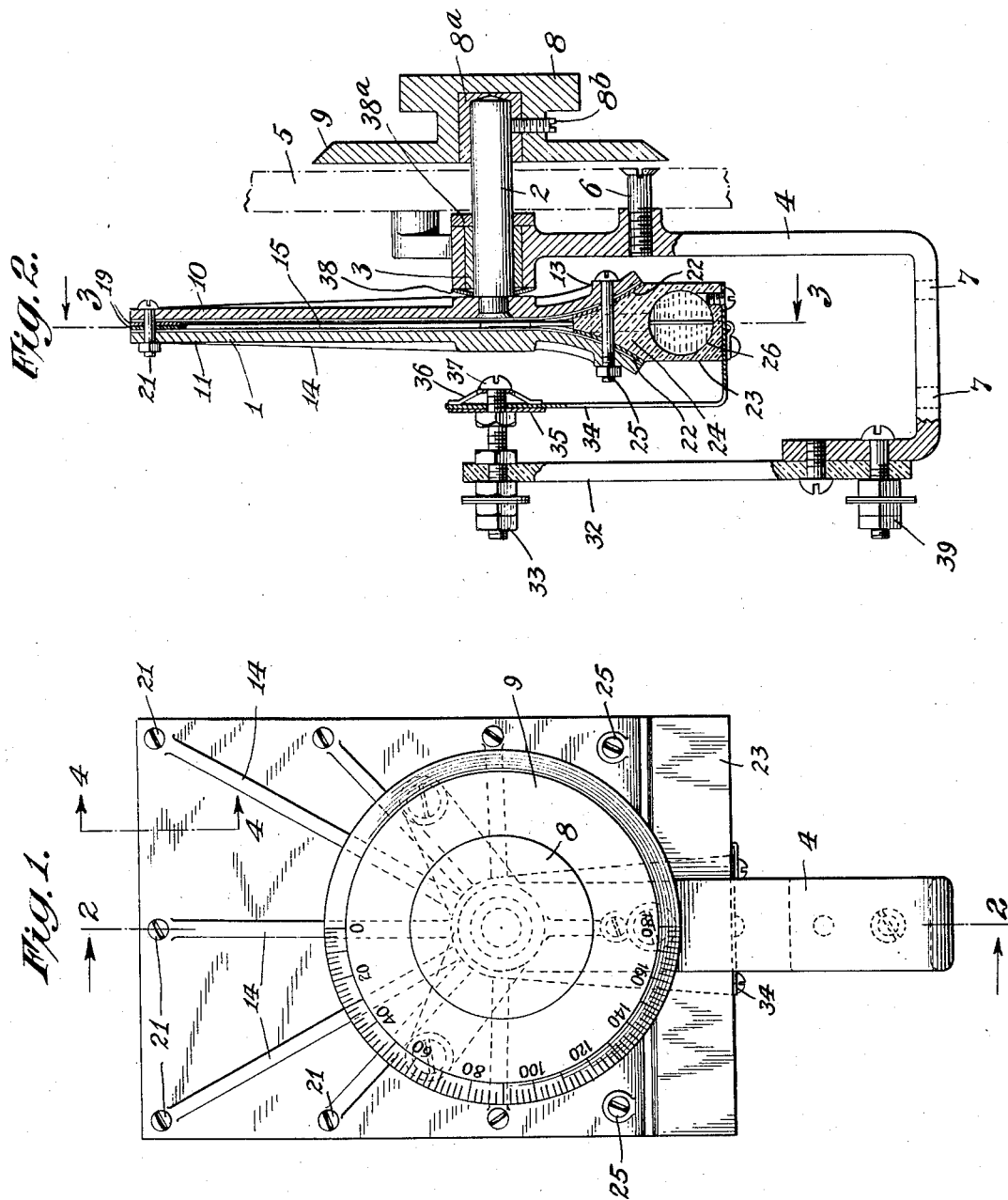
INVENTOR
William H. Priess
BY
Philip Farnsworth
ATTORNEY Sept. 29, 1925.
W. H. PRIESS
VARIABLE ELECTRICAL CONDENSER
Filed Jan. 6, 1922
1,555,253
4 Sheets-Sheet 2
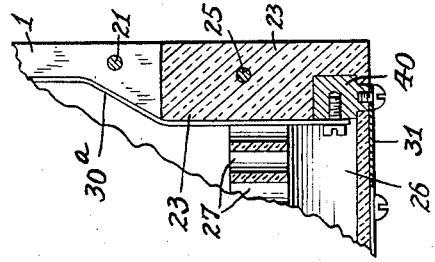
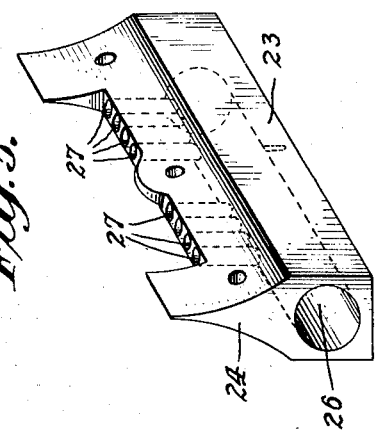
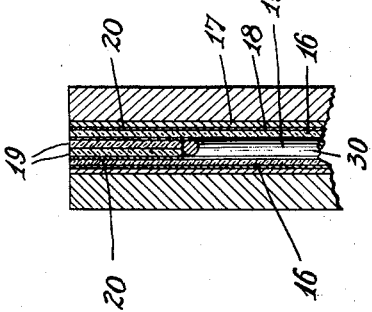
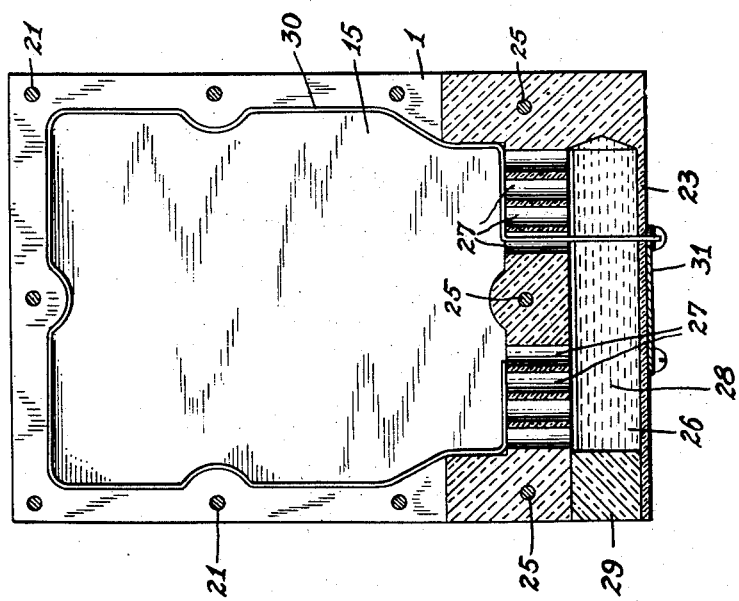
INVENTOR
William H. Priess
BY
ATTORNEY

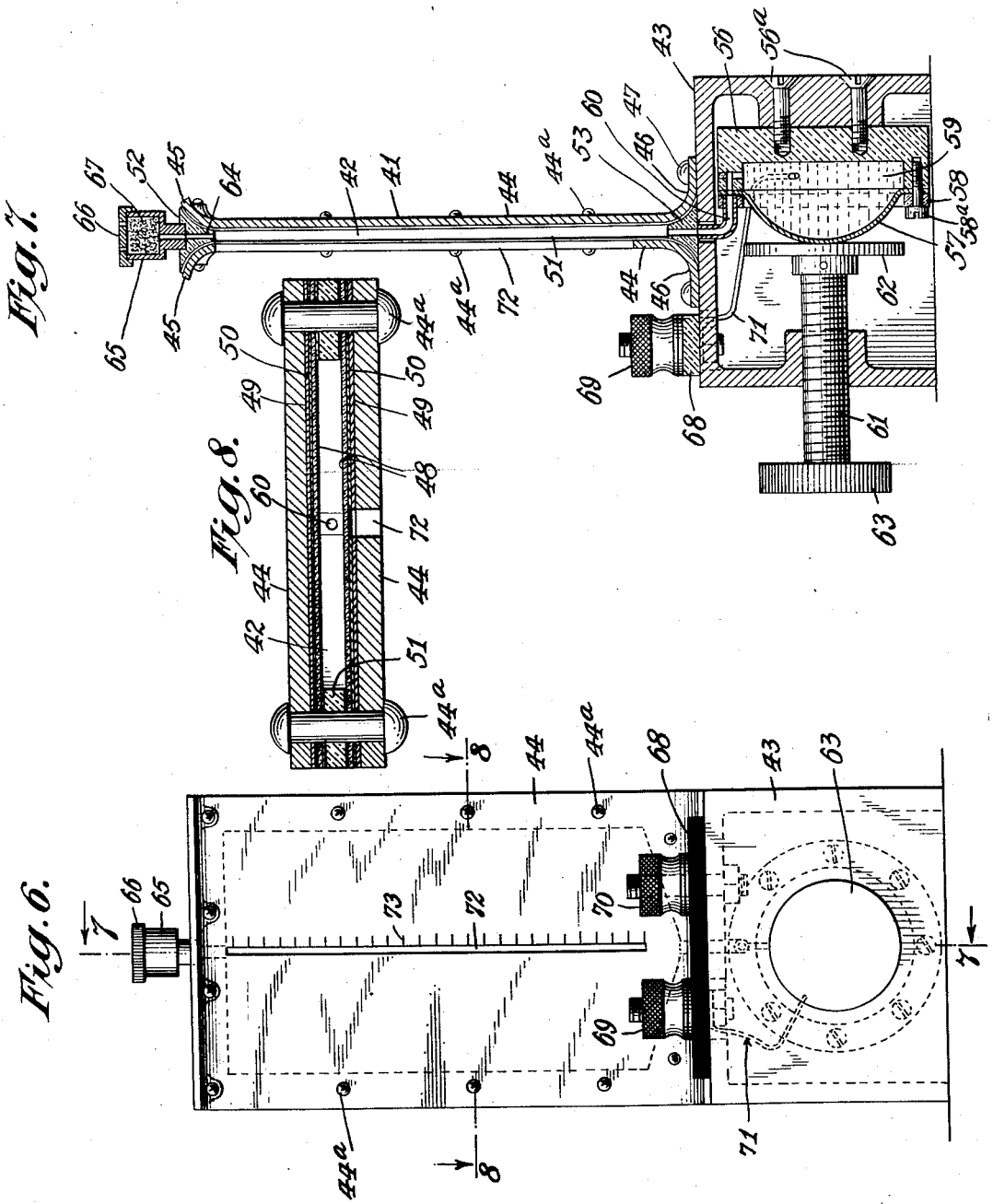

Sept. 29, 1925.
W. H. PRIESS
1,555,253
VARIABLE ELECTRICAL CONDENSER
Filed Jan. 6, 1922  4 Sheets-Sheet 4
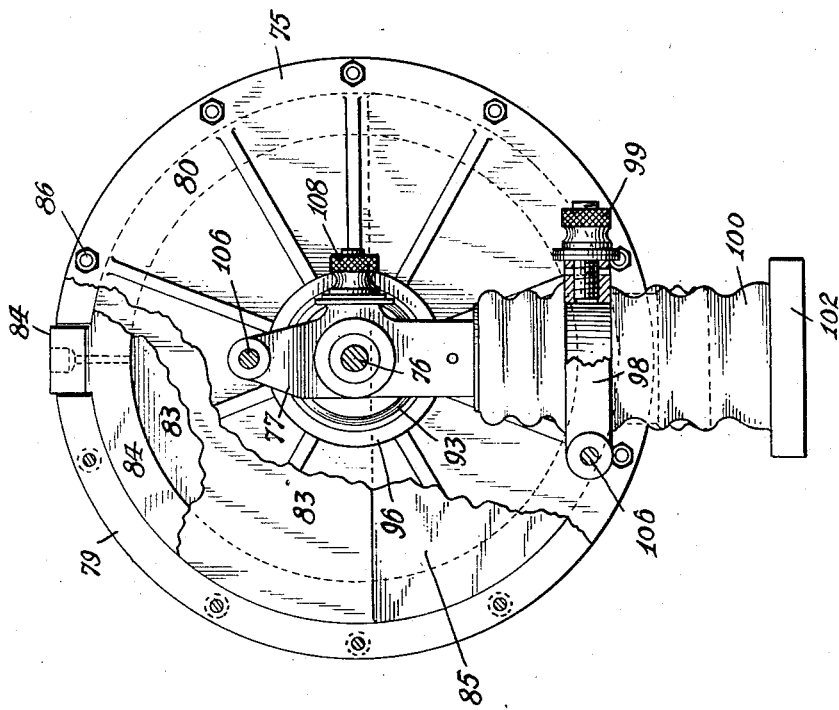
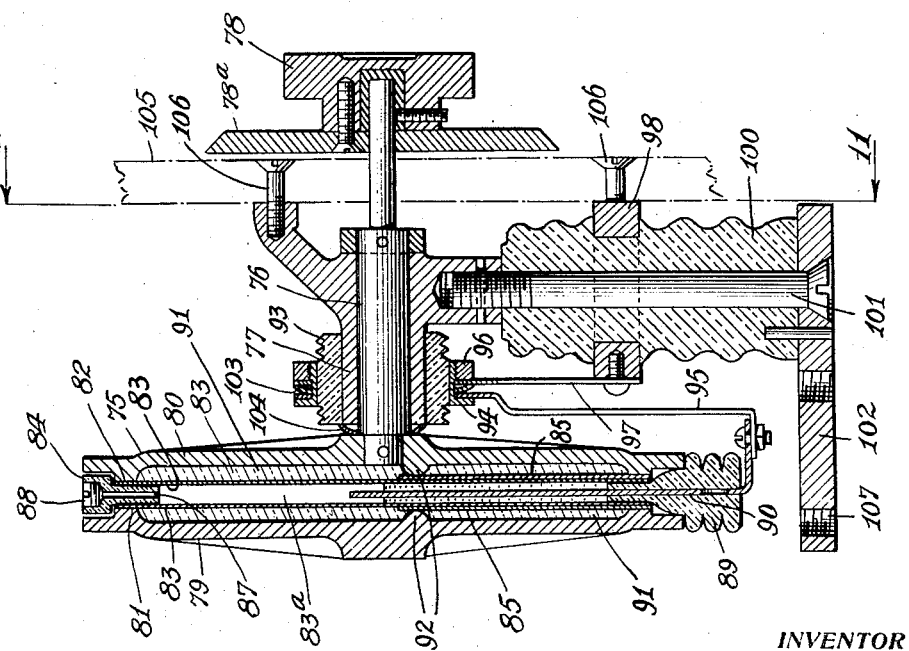
INVENTOR
William H. Priess
BY
Philip Farnsworth
ATTORNEY Patented Sept. 29, 1925.

1,555,253

UNITED STATES PATENT OFFICE.

WILLIAM H. PRIESS, OF BELMONT, MASSACHUSETTS, ASSIGNOR TO WIRELESS SPECIALTY APPARATUS COMPANY, OF BOSTON, MASSACHUSETTS, A CORPORATION OF NEW YORK.

VARIABLE ELECTRICAL CONDENSER.

Application filed January 6, 1922. Serial No. 527,450.

*To all whom it may concern:*

Be it known that I, WILLIAM H. PRIESS, a citizen of the United States of America, and a resident of Belmont, State of Massachusetts, have invented certain new and useful Variable Electrical Condensers, the principles of which are set forth in the following specification and accompanying drawings, which disclose the form of the invention which I now consider to be the best of the various forms in which the principles of the invention may be embodied.

This invention realtes to variable electrical condensers.

Variable condensers now in use comprise interleaved spaced metal plates of opposite polarity in which air is the dielectric. Difficulty is experienced in the manufacture of these condensers to secure the proper spacing between the plates, the latter being spaced by means of especially machined washers. Furthermore, such condensers in use are not reliable and very easily get out of order.

An object of the present invention is to provide an efficient, low cost, variable condenser.

Another object of the invention is to provide a variable condenser in which flat sheets of dielectric may be used.

Another object of the invention is to provide a compact variable condenser having a solid dielectric.

Another object of the invention is to provide a condenser of the variable type which can be designed to follow any desired law of capacity.

Another object of the invention is to provide a condenser of the variable type, having low loss and high dielectric strength.

Another object of the invention is to provide a condenser of the variable type having a relatively large capacity and small volume.

Broadly, my present invention contemplates the use of solid sheet dielectric such as, for instance, mica, which is the best of the many dielectrics now known, and having co-operating therewith armatures or conductors capable of relative movement over the surface of the solid dielectric upon adjustment to vary the capacity of the condenser, as desired. In the specific embodiment of the invention herein disclosed, I utilize mercury for at least one of the armatures of the condenser, although it is to be understood that any other electrically conductive liquid having the required mobility and which may be considered the equivalent of mercury may be used. It has been proposed herebefore to use mercury as an armature of a variable condenser, but such prior constructions were very bulky and not easily and accurately variable nor were they adapted to utilize a dielectric such as mica, which must be used in sheet form and substantially flat to prevent cracking thereof.

In the accompanying drawings, I have illustrated several modifications of my invention in which Figure 1 is an elevation of one form of the invention;

Fig. 2 is a sectional elevation thereof on the line 2—2 of Fig. 1, looking in the direction of the arrows;

Fig. 3 is a sectional elevation thereof on the line 3—3 of Fig. 2, looking in the direction of the arrow;

Fig. 4 is a detail sectional view on an enlarged scale and on the line 4—4 of Fig. 1, looking in the direction of the arrows;

Fig. 5 is a perspective detail view of a mercury container or reservoir;

Fig. 6 is an elevation of another form of the invention;

Fig. 7 is a sectional elevation thereof on the line 7—7 of Fig. 6 looking in the direction of the arrows;

Fig. 8 is a detail cross section thereof on an enlarged scale and on the line 8—8 of Fig. 6, looking in the direction of the arrows;

Fig. 9 is a sectional view of a modified detail;

Fig. 10 is a sectional elevation of another embodiment of the invention; and

Fig. 11 is an elevation thereof, with parts broken away and with parts in section, on the line 11—11 of Fig. 10, looking in the direction of the arrows.

In Figs. 1-5 is illustrated a rotatable or movable condenser member 1 to one side of which is secured a shaft 2 journaled in a bearing 3 on a suitable U-shaped support or standard 4. Support 4 may be secured either to a vertical fixture 5 by means of screws 6 extending through the fixture into the mounting 4 or may be secured to a horizontal fixture by means of screws extending through openings 7 at the bottom thereof.

To the opposite end of shaft 2 is secured a suitable actuating knob 8 having integral therewith an indicating dial 9, the parts 8 and 9 preferably consisting of insulating material such as molded bakelite having molded therein a metal insert 8a fitting over the end of shaft 2 and secured thereto by a set screw 8b. The condenser member 1 comprises two opposing cast iron flat plates 10 and 11, forming a casing and which are curved outwardly at their lower ends in diverging relation to each other, the plates 10 and 11 having formed thereon integral ribs 14 for strengthening the same.

The plates 10 and 11 when assembled enclose a dielectric structure having therein a flat narrow space or chamber 15 for receiving the mercury or conductive liquid as used in the present invention and having walls of dielectric 16. As illustrated more clearly in Fig. 4, the dielectric walls 16 comprise sheet dielectric, such as sheets of mica, which is one of the best dielectrics known and which, by reason of its brittleness, must be secured in the condenser without excessive bending.

In condenser constructions, it is advantageous to have the metal armatures in intimate contact with the dielectric, thereby obviating losses in the dielectric due to air or voids between the armatures and the dielectric. To secure this intimate contact with the dielectric, which preferably consists of mica as above stated, and which in this embodiment of the invention is of a size approximating the area of the several plates 10 and 11, there is secured over the entire surface of one side of each dielectric sheet 16 a metal armature or foil 17 preferably by means of a thin coating of a suitable insulating adhesive 18, such as copad or condensite varnish. In order to secure the foil to the sheet of dielectric, one side of each dielectric sheet is covered with a thin coat of varnish 18 and on this varnish is pressed a sheet of foil 17, which may be, if so desired, of relative thick soft lead foil,—for example, a lead foil 5/1000 inch thick. The foil and mica while pressed together are baked for a period of approximately eight hours at a temperature of approximately 130° C. Alternative processes, of course, may be used for securing the metal armature 17 in intimate contact with the dielectric 16. For instance, the metal armature may be sprayed on to the mica or may be deposited chemically thereon, or the armature element may be secured to the dielectric by any one of the various processes for making mirrors.

After a pair of such composite dielectric and foil elements have been made, they are secured in spaced-apart relation with the foil on the outside by interposing between them a gasket 19 of suitable flexible insulating material and to which the dielectric sheets are secured around their edges by means of a thin coating of varnish 20 as illustrated more clearly in Fig. 4, providing the space 15 between them. In the embodiment of the invention illustrated in Figs. 1 to 5, the gasket 19 is in two parts for a purpose hereinafter described. The coatings 20 may be replaced by varnished cambric if so desired. The metal protective casing plates 10 and 11, dielectric sheets 16, foil 17 and gasket 19 are then clamped together and secured by means of metal bolts 21 extending through the same and electrically connecting the plates 10 and 11 together, thereby clamping the dielectric sheets tightly against their gasket, the plates 10 and 11 being in electrical contact with the foil elements and forming a backing which prevents the dielectric sheets from bulging due to the mercury between them.

Between the diverging ends 13 of the plates 10 and 11 and between the parts of gasket 19, which are there separated as indicated at 22, is secured a mercury or conductive liquid receptacle or reservoir 23 (Fig. 5) of insulating material and having a wedge-shaped portion 24 which fits into the diverging space 22, (Fig. 1) forming with the two diverging parts of gasket 19 a tight joint closing this end of member 1, and which is secured in place by means of bolts and nuts 25. The curvature of the ends 13 of members 10 and 11 is such as to allow the mica sheets to be slightly bent outwardly to allow the insertion of receptacle 23 between them without cracking or damaging the same and to clamp the same closely. The receptacle 23 has a chamber or space 26 therein which communicates by means of passages 27 with space 15 in the member 1 between the dielectric sheets 16. The chamber 26 is adapted to be filled with a conductive liquid, such as mercury 28, which may be placed therein through an opening which is normally closed by a tight-fitting plug 29, (Fig. 3). This liquid forms one armature of the condenser when opposing the foil armatures 17 (Fig. 4) of polarity opposite to the liquid. A metal wire 30 (preferably such as does not form an amalgam with mercury; iron, for instance) is arranged around the inner edge of gasket 19 in chamber 15, as illustrated in Figs. 3 and 4, and extends through one of the passages 27 in electrical contact with the mercury 28 and through member 23, where it is secured to a metal plate 31 upon the outside of member 23, whereby the mercury when in space 15 is maintained in conductive relation with the circuit terminal 33 to be described. The size of the chamber 26 is such as to hold sufficient mercury or conductive liquid so that upon the rotation of condenser member 1, the space 15 between mica sheets 16 may be entirely filled with the liquid or may be entirely emptied thereof, whereby the capacity may be varied from approximately 0 to a maximum.

Secured to the U-shaped support 4 at the side thereof opposite the bearing 3 is a vertical insulating member 32 on which is mounted a metal terminal 33 arranged on the axis of rotation of member 1 and forming the high potential terminal of the condenser. The conductive member 31, (Fig. 3) which is in conductive relation with the wire 30 and the mercury, is electrically connected to this terminal 33 by means of a stiff metal strip 34 threaded on to the terminal 33 and rotatably engaging a metal washer or contact 35 thereon, a cup-shaped yielding metal washer 36 having slits therein being interposed between the opposite side of the strip 34, and a head 37 upon terminal 33, whereby the strip 34 is maintained in rotatable, sliding or brush electrical contact with terminal 33, such member 34 also serving with shaft 2 and bushing 3 to brace the member 1 upon its mounting 4. A cup-shaped slotted spring metal washer 38 is also interposed between the member 1 and the bearing 3, whereby sufficient friction is imposed upon the member 1 to retain it in any position in which it is placed upon the rotation of the knob 8, a collar 38ª being secured to shaft 2 at the opposite end of bushing 3 to hold the shaft in its bearing. Inasmuch as the foils 17 are electrically connected to each other through bolts 21 and 25 and to members 10 and 11 in contact therewith, which in turn are electrically connected to the support 4, the shaft 2 and bearing 3 being of metal for this purpose and washer 38 providing a sliding frictional electrical contact between the relatively rotatable parts, such support 4 constitutes the other or low potential terminal of the condenser, the opposite terminal 33 being insulated therefrom by the insulating member 32. A binding post 39, which is electrically connected to support 4, serves for the attachment of leads to the condenser.

By the above construction is provided a compact, low cost condenser having very few parts to become disarranged or dislocated and having high electrical efficiency and low loss. This, by reason of the character of dielectric used, with a foil armature in intimate or close contact therewith on one side and the mercury or conductive liquid in close or intimate contact therewith on the opposite side. Upon the rotation of the member 1 by means of the knob 8, the mercury 28 will flow through the passages 27 (Fig. 50) into the space 15 between the spaced dielectrics 16 (Fig. 4) forming, in effect, an electrical condenser having a pair of spaced dielectrics with metal armatures 17 (Fig. 4) on the outside thereof and an intermediate armature of mercury, the capacity of the condenser depending upon the amount of mercury between the mica sheets, which amount can be varied by the rotation of the structure 1 as a whole, while maintaining the close or intimate contact between the armatures and dielectric. The arrangements of contacts and leads from the several armatures of the condenser is such as to maintain close electrical contact between relatively moving parts and at the same time allow the ready rotation of the member 1, there being sufficient friction between the relatively rotating parts to maintain member 1 in any position of adjustment. In the type of condenser illustrated in Figs. 1 and 2, the member 1 is rotated approximately 140° to vary the capacity from minimum to maximum.

In Fig. 9 I have illustrated a slightly modified form of the construction of Figs. 1–5 in which a permanent metal plug 40, preferably of iron, is molded into the mercury receptacle 23, (Fig. 5) which preferably comprises moldable insulation such as bakelite. This plug is in electrical contact with the mercury or liquid within the receptacle and has attached thereto upon the inside an iron wire 30ª which extends up into the interior of the member 1, forming an electrical contact or connection between the mercury and metal plate 31 upon the outside of the member 23, the plate 31 being electrically connected to plug 40. In other respects, the construction of Fig. 9 is like that of Figs. 1–5.

In Figs. 6, 7 and 8, is illustrated a modified embodiment of the invention in which the condenser member 41 is fixed, the mercury or conductive liquid interposed between the spaced dielectrics being controlled by means hereinafter described. Member 41 has a narrow space or chamber 42 therein to receive the mercury or conductive liquid and is mounted upon a boxlike support 43 likewise of metal. The member 41 comprises, like the construction of Figs. 1 to 5, a pair of metal castings or plates 44 which are flared out at their upper ends 45 as well as at their lower ends 46, such lower ends being secured to the support 43 by means of bolts or other securing means 47. Like the construction of Figs. 1–5, member 41 also comprises a pair of spaced sheets of dielectrics 48, each of which having secured thereto in intimate contact a suitable foil, conductor or armature 49, preferably a lead foil as above described, secured to the dielectric, which is preferably of mica, by means of a thin coating of insulating varnish or adhesive 50. The sheets of dielectric and foil are processed and secured to each other preferably in the manner above described, and have an area approximating the area of the plates 44, between which they are placed. In order to provide the space 42 between the plates 44, the mica dielectrics 48 are maintained in spaced-apart relation by means of a gasket or ring 51 which is interposed between the mica sheets around the edges thereof, the upper end 52 of the gasket being flared or wedge shaped to fit between the flaring portions 45 of the members 44 and likewise being flared or wedge shaped at its lower end 53 to fit between the diverging ends 46 of plates 44. The gasket 51 may comprise any suitable insulating material, such as bakelite, between which and the dielectric sheets is interposed a thin coating of insulating varnish or varnished cambric to secure a tight joint. By the above construction, the dielectric or mica sheets with their attached foils are clamped around their edges against gasket 51 with the metal members 44 compressed against and in good electrical contact with foils 49. The curvatures of the plates 44 at their opposite ends is such to allow the mica to be slightly bent without danger of cracking or injuring the same. At other points, where the mica sheets constitute the active dielectric, the latter are maintained substantially flat providing between them the restricted space 42 adapted to receive the armature of mobile conducting liquid or mercury, the plates 44 closely fitting the dielectric sheets, forming a backing therefor to prevent bulging thereof outwardly by the mercury, while at the same time providing a neat casing and clamping the sheets against the gasket by means of bolts or rivets 44ᵃ. Mounted within the box-like structure 43, is an insulating cup 56 secured therein by means of the screws 56ᵃ. The open end of the cup 56 is closed by a flexible diafram or bulb 57 of any suitable material such as leather or rubber, which is clamped tightly thereto by means of a clamping ring 58 and screws 58ᵃ. The space or chamber 59 between the cup 56 and diafram 57 which form a reservoir is adapted to be filled with a mobile conductive liquid such as mercury, and is provided with a passage 60 communicating with the narrow chamber 42 between the plates 44. In order to force the mercury in varying amounts between the dielectrics 48 and into the space 42, I have mounted upon the structure 43 an adjustable screw 61 provided at its inner end with a plate or plunger 62 adapted to engage the flexible bulb 57, the outer end of the screw 61 being provided with a suitable knurled adjusting head 63. The space 59 within the mercury cup 56 is filled through a passage 64 in the upper end of the condenser and in gasket 51. After filling, the passage 64 is plugged by means of a hollow and longitudinally perforated plug 65 having a perforated cover 66 and in which is placed an absorbent material 67, such as wool or fiber, to allow a circulation of air therethrough to the chamber 42 upon changes of mercury level therein. The chamber 59 is filled with the plunger 62 out of engagement therewith to allow complete filling thereof. The chamber 59 has a cubic capacity equal to or greater than the cubic capacity of chamber 42 whereby upon adjustment of screw 61 the electrical capacity of the condenser may be varied from 0 to a maximum.

Secured to the boxlike support 43 is an insulating strip 68 on which are mounted a pair of separated terminal posts 69 and 70, the terminal post 69, the high potential terminal, being electrically connected by means of a metal strap 71 with the mercury in the cup 56 and the post 70, the low potential terminal, being electrically connected to the outer armatures through the conductive stand 43 and plates 44.

In order to visually determine the height of the mercury at any time within the condenser member 41, one of the members 44 and one of the flat foil sheets has a vertical slot 72 therein through which the liquid level may be observed through the transparent mica. If so desired, the slot 72 may be graduated or provided with a scale as indicated at 73 in Fig. 6.

In the construction illustrated in Figs. 6, 7 and 8, for any given setting of screw 61, the capacity is maintained constant over wide angles of accidental tilt as contrasted with the rotatable types illustrated in Figs. 1 and 10. For any given setting, there is a definite quantity of mercury in the space between the dielectrics. Assuming this space to be of uniform width throughout, a given quantity of mercury will cover the same area, irrespective of whether the whole condenser is tilted, or not level up to the point at which a further tilt would cause the mercury to run out of the passage 60. The amount of mercury or conductive liquid forced into the space or chamber 42 may be read by the amount of axial movement of plunger 62 by the amount of rotation of knob 63 or by the visual or direct reading scale 73.

Referring to Figs. 10 and 11, I have illustrated another form of the condenser of the present invention. Like that of Fig. 1, this form comprises a rotatable condenser member 75 secured to a shaft 76, rotatably journaled in a bearing 77 and actuated by a knob 78 which is preferably of insulating material such as molded bakelite, the knob 78 having an indicating dial 78ᵃ secured thereto and being secured to shaft 76 in the manner described in connection with Fig. 2. Member 75, like the construction of Fig. 1, comprises a pair of opposing cast iron case plates 79 and 80, which in this form are substantially circular, the shaft 76 being secured to the center thereof forming a substantially balanced construction. Upon the inner faces of the members 79 and 80, and spaced inwardly slightly from their periphery, are a pair of annular ribs or ledges 81 and 82. A pair of flat mica disks or insulating sheets 83 have interposed between them a ring or gasket 84 of insulating material, having an insulating varnish coating or varnished cambric upon opposite sides with which the sheets of dielectric engage to form a tight joint, and to form a chamber or space 83$^a$ between them to receive a conductive liquid or mercury to form an armature of the condenser, the annular ribs 81 and 82 being clamped against the sheets 83 by means of bolts 86 extending through plates 79 and 80, insulating sheets 83 and gasket 84.

In the form of condenser illustrated in Figs. 10 and 11, I secure to the outside of the sheets 83 foil conductors or armatures 85 which are in intimate contact with the dielectric, being preferably secured thereto by a small amount of varnish, such as copad varnish as above described. In the present instance, however, instead of covering the entire outer surfaces of the dielectric or mica, as in Figs. 1–5, the foil or metal armatures 85 are semicircles or segmental in shape and cover a portion or a half of the outer surfaces of the dielectric sheets, the periphery of the same being clamped between the ribs 81 and 82 of the members 79 and 80 and the gasket 84 as illustrated in Fig. 10 and in conductive relation to members 79 and 80.

At a point upon the periphery of the member 75, the gasket 84 is provided with a passage 87 therethrough, through which may be poured the right amount of mercury or similar conductive liquid forming an armature of the condenser and which should fill substantially one-half of the space 83$^a$ between the dielectrics 83. The proper amount of conductive liquid is secured by pouring into the member 75 quantities thereof measured or calculated by volume or weight or by pouring or forcing in sufficient liquid to produce a given capacity reading on test with a capacity meter. If desired, the mercury may be forced into the condenser by air pressure. The passage 87 after the mercury has been placed therein may be closed by a suitable closure such as a screw 88 which may be sealed by a suitable wax or varnish, if so desired.

At a point diametrically opposite to the closure 88, the gasket 84 is enlarged as indicated at 89, through which extends and in which is sealed by molding with ring 84 a metal strip 90 (preferably iron) which extends over halfway across the chamber 83$^a$ between the dielectrics 83 and foil armatures 85 and through the mercury therein constituting a conductive connection from the mercury inside to the outside of the member 75.

In order to reduce the capacity effect between the mercury armature and the casing plates 79 and 80, the latter are spaced from the dielectric 83, especially at points not covered by foil 85, providing spaces 91 between the plates 79—80 and dielectric 83. To prevent the flat insulating dielectric or mica 83 from buckling or bulging at the center, the members 79 and 80 are provided upon their interior centrally thereof with lugs 92 which engage the central portions of the mica sheets and the upper edges of the foil sheets 85, thereby preventing the mica from buckling or bulging by reason of the weight of the mercury therein. The sheets 83 are further reinforced or backed up by filling the spaces 91 with an insulating filler such as paraffin or other suitable wax.

Mounted around the bearing 77 is an insulating sleeve 93, on which is secured an annular metal race 94. A conductor 95 of relatively stiff metal strip is conductively connected to the member 90 and terminates in an annular member which slidably rides in the race 94 concentric with the axis of rotation of member 75. A ring 96 is threaded upon the raceway 94, and retains thereon not only conductor 95 but also a conductor 97 which has engagement with the ring 96 at one end and is secured at its opposite end to a metal ring 98 having a high potential terminal 99 and which is mounted upon an insulator 100, the insulator 100 supporting the bearing 77 by means of a bolt 101 which extends through a base plate 102, through insulator 100, and is threaded into the bearing 77. Interposed between the conductor 95 and the conductor 97 is a cup-shaped concavo-convex slitted metal washer 103 which maintains a frictional engagement between the relatively sliding parts, hence maintaining a good electrical contact and providing sufficient friction with a similar washer 104 interposed between the bearing 77 and member 75 for retaining the condenser member 75 in any position of adjustment. As in the construction of Fig. 1, the condenser disclosed in Fig. 10 may be mounted upon a vertical support 105 by means of screws 106 extending through the support into the condenser mounting, or it may be mounted upon a horizontal support by similar screws extending through the openings 107 in the base 102. The opposite terminal 108 of the condenser is electrically connected to the bearing 77 as shown in Fig. 11, the bearing 77 and shaft 76 being mounted as described above and forming a conductor from foils 85 and comprising relatively sliding parts.

In the form of condenser illustrated in

Figs. 10 and 11, the parts have been much simplified and it is to be understood that it is capable of modification. For instance, the lead or connection 95, instead of extending along the member 75 in the manner shown in Fig. 10, may extend along the opposite side of the member and may have a sliding engagement with terminal mounted on a support in the manner shown in Fig. 2.

The construction of Fig. 10 and Fig. 11 forms a balanced construction for any position of member 75 when adjusted to vary the relative position of the half plates 85 and the mercury armature between the dielectrics 83, while maintaining their contact with the dielectric. This adjustment is made by means of the knob 78 and the frictional resistance is sufficient to maintain not only a good electrical contact between relatively sliding parts but also to maintain the condenser in any position in which it is placed. In this type of condenser, the capacity may be varied between a minimum capacity (not 0) when the mercury and plates 85 are not in overlapping position and a maximum when the opposing armatures are in maximum overlapping relation.

The balanced form illustrated in Figs. 10 and 11 differs from the form illustrated in Figs. 1 and 2 in degree of balance only. The balance in the former is perfect while that of the latter is imperfect, but a close approximation of the former. The movable condenser members (not including the mercury of both forms) are balanced on their shafts. The mercury is therefore the only possible unbalancing element. In the form of Figs. 10 and 11, the chamber 83ª is of uniform width and hence the center of gravity of the mercury is not altered by turning the member and therefore no unbalanced force is introduced. In the form illustrated in Figs. 1 and 2, the center of gravity of the liquid is shifted slightly upon rotation of the member, and to this degree the condenser is unbalanced. The advantage of the form of Figs. 10 and 11 over that of Figs. 1 and 2 is that less frictional resistance need be introduced, sufficient only to secure the necessary good electrical contact between relatively sliding parts, while in the latter form sufficient friction must be introduced to maintain the setting. The form shown in Figs. 6 and 7 differs from the others in that the capacity is varied by displacement feed of the mercury instead of by a gravity control. For the former purpose, the space above the mercury level is in constant communication with the air through the porous plug 65.

The condensers herein described are characterized by high efficiency and low cost. The constructions are relatively small and have high capacity, the capacity, of course, depending upon the thickness of the dielectric employed.

These condensers by proper designing are also adapted to follow any desired law of capacity variation, such as a law of geometrical progression or a straight line law. The law of capacity variation can be made to follow any desired curve by properly shaping the gasket, the active area of the mica or the foil elements.

Upon the rotation of the condenser member of the rotatable forms herein described, the active area of the condenser is varied; that is to say, more or less of the mercury layer between the dielectrics overlap the corresponding metal foil upon the outside of the dielectric, thereby giving a range of condenser capacity from minimum to maximum. The condenser designs herein described and shown are adaptable for condensers of different maximum capacities by employing different thicknesses of dielectric or mica. By way of example, in designs as actually made with a mica thickness of 2.25 mils, the maximum capacity was .01 mfd. If a 5 mil sheet of mica be used, the maximum capacity of the condenser will be .005 mfd. For higher capacities, the condenser elements may be assembled in parallel in the same casing. It is preferable that the mercury used should be previously distilled to make it free flowing and to free it from amalgams. The above-described condensers may be used for all purposes such as in receiving and transmitting in radio apparatus, in the latter use a suitable spark-gap being employed between the terminals.

It is to be understood that the invention is not limited to the embodiments and features specifically shown and described herein, but that such embodiments and features are subject to changes and modifications without any departure from the spirit of the invention.

I am aware of the patents to San Martin 1,108,793 of August 25, 1914, and Parkin 1,433,224 of October 24, 1922; but the apparatuses hereof are commercial, marketable instruments and embody various practical and valuable features of distinction therefrom.

I claim:—

1. A variable condenser of the type having a liquid armature, comprising a structure formed with a hollow to receive the conducting liquid, said structure comprising a metal casing substantially enclosing the armatures and dielectric of the condenser; a metal support for said structure and electrically connected with the metal casing thereof; a solid condenser-armature in electrical connection with said metal casing; a condenser-dielectric separating said solid armature from the hollow of the structure; a condenser terminal mounted outside of the hollow structure and electrically connected with said solid armature; a second condenser terminal insulated from the metal enclosing casing and its support; a terminal lead connecting the liquid armature to said second terminal; and means for permitting relative movement of the liquid and solid armatures.

2. A variable condenser of the type having a mercury armature, comprising a metal supporting structure; a structure rotatably mounted thereon and comprising a condenser formed hollow to receive variable quantities of mercury and having a solid armature electrically connected to said supporting structure; two circuit terminals mounted on said metal supporting structure; and a sliding connection between one of said terminals and the mercury armature; the other of said circuit terminals being electrically connected to said supporting structure and thereby to said solid armature.

3. An electrical condenser member for a condenser of the type having one armature of mercury, which comprises two dielectric sheets separated from one another by an air space receiving variable quantities of the mercury; thin solid armatures outside said space and in intimate contact with said dielectric sheets and extending substantially over the entire outer surfaces of said sheets; and a metal protective casing substantially enclosing said dielectric sheets and solid armatures save for a mercury-passage to said space.

4. A variable condenser comprising a support, a member mounted rotatably thereon and comprising a dielectric element and also armature elements which are relatively movable to one another upon rotation of the condenser member, one armature being a liquid; a condenser terminal; and a substantially stiff lead electrically connected to one of said armatures and mechanically connected to a rim of said rotatable member, and having a frictional contact with said condenser terminal operating about the axis of said rotatable member as a center.

5. A variable condenser of the type having a liquid armature, comprising a support, a condenser member having a metal enclosing casing, said metal casing being mounted on said support; said condenser member being formed with a hollow to receive the liquid armature and including a solid armature and a dielectric between the solid armature and the hollow; a condenser terminal; a terminal lead connected to the liquid of the liquid armature and extending from the perifery of said metal-enclosed condenser member; an insulating member separating said lead from said metal enclosing casing; and a frictional contact arranged to act about the axis of rotation of the condenser member and connecting said terminal lead to the condenser terminal.

6. A variable condenser of the type having a liquid armature, comprising a metal support; a condenser member rotatably mounted thereon and formed with a hollow to receive the liquid armature and including a solid armature and a dielectric between the solid armature and the hollow; a terminal lead connected to the liquid of the liquid armature and extending out from the perifery of the condenser member; an insulating member mounted on the support of the rotatable condenser member; a condenser terminal mounted on said insulating member; and a sliding electrical connection between the condenser terminal and the terminal lead; said sliding connection being constructed and arranged to operate about the axis of the rotatable condenser member.

7. A variable condenser of the type having a liquid armature, comprising a metal support, a condenser member rotatably mounted thereon, formed with a hollow to receive the liquid armature, and including a solid armature and a dielectric between the solid armature and the hollow; a metal casing enclosing said condenser member; a terminal lead connected to the liquid armature and extending from the perifery of the rotatable metal casing; an insulating member separating said terminal lead from said metal enclosing casing; a second insulating member mounted on the metal support of the rotatable condenser member; a condenser terminal mounted on said second insulating member; and a sliding electrical connection between said terminal lead and said condenser terminal, said sliding connection being constructed to operate about the axis of the rotatable condenser member.

8. A variable condenser of the type having a liquid armature, comprising a metal support, a condenser member rotatably mounted thereon by way of a metal shaft which bears in the metal support; said condenser member having a solid armature and being formed hollow to receive the liquid armature; said metal support being connected to one of the condenser armatures by way of the shaft; an insulating member mounted on said metal support; a condenser terminal mounted on said insulating member; a terminal connection from the other condenser armature; and a sliding contact connection between said terminal connection and condenser terminal, said sliding connection being constructed and arranged to operate about the axis of the rotatable condenser member.

9. In a variable condenser, a support, a condenser member rotatably mounted on said support and comprising sheets of dielectric having a gasket between them forming a chamber between said sheets adapted to receive a conductive liquid forming an armature of the condenser, opposing metal foil armatures on the outer sides of said dielectric sheets, metal plates enclosing said sheets and armatures clamping the parts together and in contact with said metal armatures and whereby the condenser member is supported, leads from said armatures including sliding and frictional connections, and terminals on the support to which the leads are connected by said connection.

10. In a variable condenser, a condenser member comprising a pair of sheets of dielectric having interposed between them an insulating gasket forming therewith a narrow chamber adapted to receive a conducting liquid, metal foil armatures in contact with the outer faces of said sheets of dielectric, substantially rigid metal clamping plates enclosing said sheets and clamping the dielectric sheets to the gasket and electrically connected to said metal foil armatures, a metal support having a bearing, a shaft rotatably mounted in said bearing and to which said condenser member is secured, a condenser terminal mounted on said support and electrically connected to said clamping plates, a second condenser terminal mounted on said support and insulated therefrom; and a lead located in said condenser member chamber, extending through said condenser member at the rim and electrically connected to said second terminal and including relatively sliding and frictionally engaging contacts insulated from and arranged on said support to operate about the axis of rotation of said condenser member.

11. A variable condenser comprising a support having a bearing, a shaft rotatable in the bearing, a condenser member secured at one side to one end of said shaft and comprising armatures and dielectric relatively movable upon rotation of said member to vary the capacity; a condenser terminal and a substantially stiff lead extending from the rim of said condenser member and along the side thereof opposite to said shaft connection, and having a sliding and frictional connection to a condenser terminal, said connection being constructed and arranged to operate about the axis of rotation of the condenser member.

12. A variable condenser comprising a support and a condenser member rotatably mounted on the support and comprising dielectric sheets having a gasket interposed between their edges and forming a chamber adapted to receive a conductive liquid, a thin metal armature upon the outer face of at least one of said sheets and substantially rigid metal clamping members for securing the sheets and gasket together and constituting a casing therefor and constituting means for mounting said condenser member on said support.

13. In a variable condenser, a support having a metal bearing, a metal shaft rotatably mounted in said bearing and having an insulating actuating handle, a condenser member secured to one end of said shaft and comprising spaced sheets of dielectric having a gasket interposed between them forming a narrow chamber to receive a conducting fluid, metal foil armatures secured to the outer surfaces of said sheets, substantially rigid metal plates clamping said dielectric sheets to the gasket, and engaging said metal foil armatures; a terminal lead extending through said gasket into said chamber between said metal armatures and in electrical contact with said liquid, terminals insulated from each other and mounted on said support and sliding electrical connections insulated from each other between said terminals and said plates and lead respectively, one of said connections comprising said shaft and bearing and the other comprising relatively sliding contacts arranged to operate about with the axis of rotation of said member.

14. A variable condenser of the type having a liquid armature, comprising a condenser member having a solid armature and formed with a hollow to receive the liquid armature; a support to which said condenser member is pivotally connected; a metal casing for said condenser member located adjacent the solid armature; and a reservoir consisting of insulating material for the reception of the conducting liquid of the liquid armature, said insulating reservoir having communication with the hollow of the condenser member and being supported by said metal casing in position to permit movement of the conducting liquid between the reservoir and the hollow of the condenser member when the metal casing and the condenser member are swung on their pivot in the support.

15. In a variable condenser having one armature consisting of a conducting liquid, the combination with a structure mounted to be movable and formed hollow for the conducting liquid, the volume of the hollow being greater than that of the liquid armature; a dielectric condenser-member adjacent a part of the hollow and constituting a part of said movable structure; a solid condenser armature adjacent said dielectric member on the side opposite to the hollow and also constituting a part of the movable structure; and a terminal lead for the conducting liquid, said lead being located in the hollow, constituting a part of the movable structure, extending outwardly from said structure at a point remote from said solid armature, and extending inwardly of said structure and into the hollow thereof to a point adjacent said solid armature.

16. A variable condenser of the type having a mercury armature; comprising a condenser member combined with a mercury reservoir; said condenser member including a pair of dielectric sheets spaced apart from one another, said space being in mercury communication with said reservoir; a metal protective casing substantially enclosing said dielectric sheets; said condenser member including also a thin solid armature in intimate contact with the face of one dielectric sheet; said solid armature lying outside said space, remote from said reservoir and between said dielectric sheet and said metal protective casing and enclosed by the latter.

17. A variable condenser of the type having a mercury armature; comprising a condenser member combined with a mercury reservoir; said condenser member including a pair of dielectric sheets spaced apart from one another, said space being in mercury communication with said reservoir; a metal protective casing substantially enclosing said dielectric sheets; said condenser member including also a thin solid armature in intimate contact with the face of one dielectric sheet; said solid armature lying outside said space, remote from said reservoir and between said dielectric sheet and said metal protective casing and enclosed by the latter; the metal casing member adjacent said solid armature constituting a supporting backing therefor.

18. A variable condenser of the type having a mercury armature; comprising a condenser member including a pair of substantially flat dielectric sheets spaced apart from one another, said condenser member including also a substantially flat solid armature outside said space and in intimate contact with the face of one said dielectric sheets; a metal protective casing substantially enclosing said condenser member; a mercury reservoir located substantially outside said condenser-member casing; means securing together via said condenser-member casing, said reservoir and condenser member, for mercury communication between the reservoir and the substantially flat space in the condenser member; and means permitting relative movement of said condenser member and the mercury in said reservoir.

19. A variable condenser of the type having a mercury armature; comprising a condenser member including a pair of substantially flat dielectric sheets spaced apart from one another, said condenser member including also a substantially flat solid armature outside said space and in intimate contact with the face of one said dielectric sheets; a metal protective casing substantially enclosing said condenser member; a mercury reservoir located substantially outside said condenser-member casing; means securing together, via said condenser-member casing, said reservoir and condenser member, for mercury communication between the reservoir and the substantially flat space in the condenser member; and supporting means for the combined reservoir and condenser member which permits movements of condenser member and reservoir into positions of the latter above the space in the former.

WILLIAM H. PRIESS.